United States Patent
Guo et al.

(10) Patent No.: US 11,228,598 B2
(45) Date of Patent: Jan. 18, 2022

(54) OFFLINE MODE USER AUTHORIZATION DEVICE AND METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Peng-Fei Guo, Zhengzhou (CN); Ze Yao, Shenzhen (CN); Yue-Ping Zhou, Shenzhen (CN); Shou-Feng Fan, Shenzhen (CN); Fu-Fa Cai, Shenzhen (CN); Hui-Feng Liu, Shenzhen (CN); Xin Lu, Shenzhen (CN); Chuan Xiao, Zhengzhou (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 219 days.

(21) Appl. No.: 16/503,715

(22) Filed: Jul. 5, 2019

(65) Prior Publication Data
US 2020/0314105 A1    Oct. 1, 2020

(30) Foreign Application Priority Data

Apr. 1, 2019    (CN) .......................... 201910256290.9

(51) Int. Cl.
*H04L 29/06*    (2006.01)
*G06F 21/60*    (2013.01)

(52) U.S. Cl.
CPC .......... *H04L 63/102* (2013.01); *G06F 21/604* (2013.01); *H04L 63/101* (2013.01)

(58) Field of Classification Search
None
See application file for complete search history.

(56) References Cited

U.S. PATENT DOCUMENTS

| | | | | |
|---|---|---|---|---|
| 7,353,231 | B1* | 4/2008 | Eslambolchi | G06F 16/283 |
| | | | | 707/602 |
| 2003/0174648 | A1* | 9/2003 | Wang | H04L 67/288 |
| | | | | 370/235 |
| 2004/0168066 | A1* | 8/2004 | Alden | H04L 63/083 |
| | | | | 713/182 |
| 2006/0121992 | A1* | 6/2006 | Bortnik | A63F 13/79 |
| | | | | 463/43 |
| 2006/0183462 | A1* | 8/2006 | Kolehmainen | H04W 12/50 |
| | | | | 455/411 |

(Continued)

*Primary Examiner* — Jason Chiang
(74) *Attorney, Agent, or Firm* — ScienBiziP, P.C.

(57) ABSTRACT

An offline mode user account authorization method includes obtaining an access privilege of a user account and setting an offline task access privilege of the user account according to the access privilege, retrieving user account information corresponding to a task to be executed from a preset task information comparison table when the task to be executed is implemented, determining whether the user account is online, executing the task to be executed with a user ID of the user account if the user account is online, and creating a super offline user account and assigning offline task access privilege of the user account to the super offline user account if the user account is not online. The implemented task to be executed is executed with the super offline user account.

12 Claims, 3 Drawing Sheets

(56) References Cited

U.S. PATENT DOCUMENTS

| | | | |
|---|---|---|---|
| 2007/0157292 A1* | 7/2007 | Danner | G06F 21/604 |
| | | | 726/4 |
| 2007/0174283 A1* | 7/2007 | Lee | H04L 63/20 |
| 2013/0091274 A1* | 4/2013 | Fanto | H04N 21/4788 |
| | | | 709/224 |
| 2014/0150080 A1* | 5/2014 | Miller | H04N 21/8355 |
| | | | 726/9 |
| 2014/0208220 A1* | 7/2014 | Watal | G06Q 10/101 |
| | | | 715/738 |
| 2014/0359709 A1* | 12/2014 | Nassar | H04L 65/1083 |
| | | | 726/4 |
| 2015/0150142 A1* | 5/2015 | Austin | G06F 9/4812 |
| | | | 726/26 |
| 2015/0262174 A1* | 9/2015 | Mongillo, III | G06Q 50/12 |
| | | | 705/15 |
| 2018/0157535 A1* | 6/2018 | Dushok | G06F 11/3433 |
| 2018/0337906 A1* | 11/2018 | Spektor | G06F 21/33 |
| 2018/0375886 A1* | 12/2018 | Kirti | H04L 63/104 |
| 2019/0238548 A1* | 8/2019 | Chauhan | H04L 67/34 |

\* cited by examiner

OFFLINE MODE USER AUTHORIZATION DEVICE AND METHOD

FIELD

The subject matter herein generally relates to computing devices, and more particularly to an offline mode user authorization device and method.

BACKGROUND

There are many large-scale distributed production systems for enterprise, such as Spring, Oauth2.0 (Open Authorization Standard), SSO (Single Sign On) for access privilege control. However, login statuses of user accounts may be unclear when performing customized tasks.

BRIEF DESCRIPTION OF THE DRAWINGS

Implementations of the present disclosure will now be described, by way of embodiments, with reference to the attached figures.

DETAILED DESCRIPTION

Figure 1:
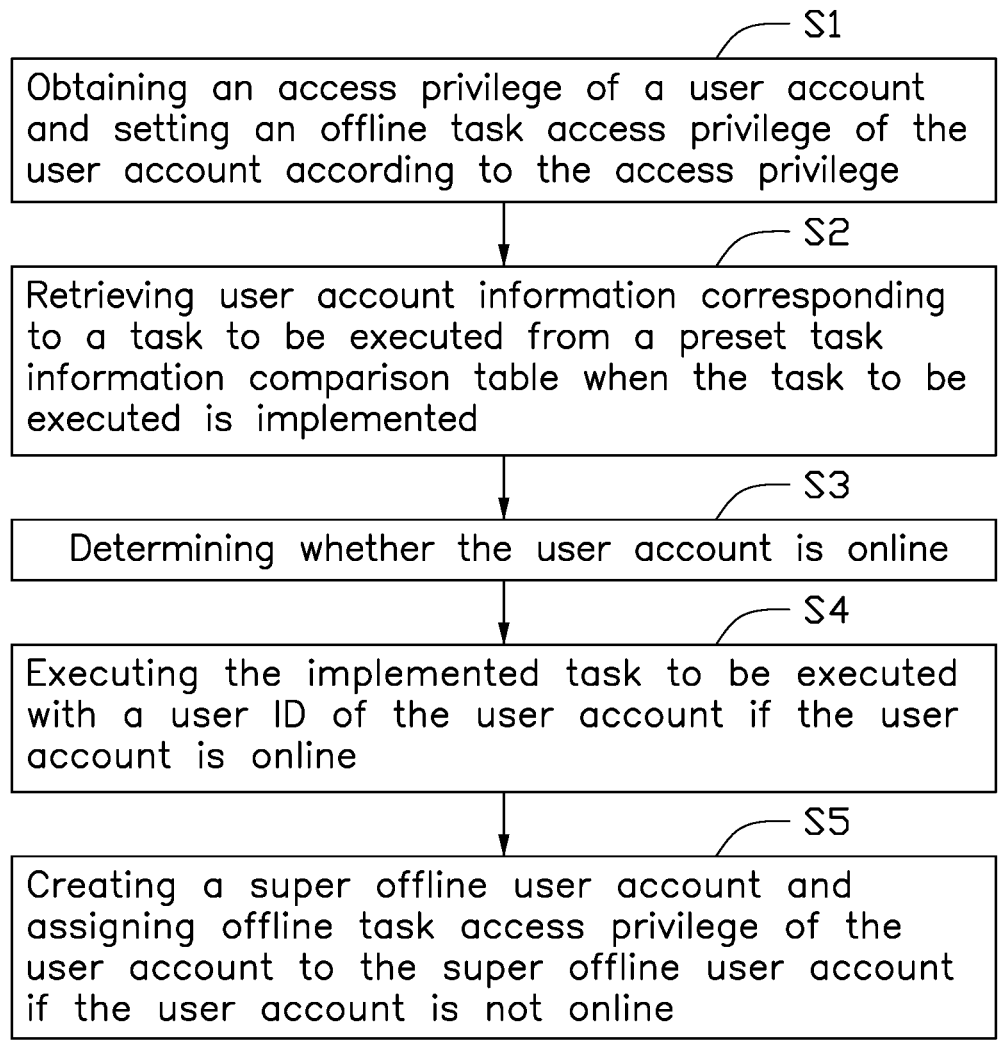
FIG. 1 is a flowchart of an offline mode user authorization method.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" means "including, but not necessarily limited to"; it specifically indicates open-ended inclusion or membership in a so-described combination, group, series and the like.

In general, the word "module" as used hereinafter refers to logic embodied in hardware or firmware, or to a collection of software instructions, written in a programming language such as, for example, Java, C, or assembly. One or more software instructions in the modules may be embedded in firmware such as in an erasable-programmable read-only memory (EPROM). It will be appreciated that the modules may comprise connected logic units, such as gates and flip-flops, and may comprise programmable units, such as programmable gate arrays or processors. The modules described herein may be implemented as either software and/or hardware modules and may be stored in any type of computer-readable medium or other computer storage device.

FIG. 1 shows a flowchart of an offline mode user account authorization method. The order of blocks in the flowchart may be changed according to different requirements, and some blocks may be omitted.

At block S1, an access privilege of a user account is obtained, and an offline task access privilege of the user account is set according to the access privilege.

Offline task information can include one or more of a task ID, a user ID, a user account name, task contents, task parameters, and a task execution scheduling plan.

In one embodiment, a user account is registered in the Oauth2.0 system, and an Oauth2.0 server allocates a corresponding access privilege to the user account according to information filled in by a user and according to preset system specifications. After obtaining the access privilege, offline tasks are set according to a scope of the access privilege and according to a scope of tasks to be handled.

At block S2, when a task to be executed is implemented, user account information including the user ID corresponding to the task to be executed is retrieved from a preset task information comparison table.

In one embodiment, implementation of tasks in the Oauth2.0 system is performed by an asynchronous queue, and multiple tasks can be implemented concurrently. When the task is implemented, the system retrieves the user account information of the user account that created the task from the task information comparison table.

At block S3, whether the user account is online is determined.

Whether the user account is online is determined by searching, in a user account login information table, whether login information of the user account exists according to user account name information, and determining whether the user account is online according to the search result.

In one embodiment, in the Oauth2.0 system, when the task to be executed is implemented, the system retrieves the user account information of the user account that created the task from the task information comparison table and retrieves the login information of the system. If the user account is logged in, the user account is determined to be online according to a login status.

At block S4, if the user account is online, the implemented task to be executed is executed with the user ID of the user account.

In one embodiment, when the user account is online, a login token is directly obtained with the user ID to execute the task.

At block S5, if the user account is not online, a super offline user account is created, and offline task access privilege of the user account is assigned to the super offline user account.

The user account information is obtained from the task information comparison table, and the offline task scope of the user account is retrieved according to the user account information. The access privilege of the offline task scope is assigned to the super offline user account, so that the offline task can be completed.

In one embodiment, in the Oauth2.0 system, since the user account is in an offline state, the login token of the user account cannot be obtained to execute the implemented offline task. At this time, the system creates a super offline user account, and the access privilege of the super offline user account is assigned according to the offline task set by the user account.

As shown in Table 1 below, user account A creates tasks 001 and 002, and user account B creates task 003. Task contents corresponding to task 001, task 002, and task 003 are task A, task B, and task C, respectively. At this time, the Oauth2.0 system opens three threads to create super offline user account 1, super offline user account 2, and super offline user account 3 to complete the tasks 001, 002, and 003, respectively. Super offline user account 1 and super offline user account 2 obtain all of the access privilege of user account A, and super offline user account 3 obtains all of the access privilege of user account B. At a preset time of 8:00 am, when user account A is determined to not be online according to the login information of user account A in the user account login information table, super offline user account 1 obtains all of the access privilege of user account A and executes tasks 001 and 002. Similarly, at 8:00 am, when user account B is determined to not be online according to the login information of user account B in the user account login information table, super offline user account 3 obtains all of the access privilege of user account B and executes task 003.

TABLE 1

| Username | Task name | Task contents | Super offline user account | Time |
|---|---|---|---|---|
| User A | 001 | Task A | Super offline user account 1 | 8:00 am |
| User A | 002 | Task B | Super offline user account 2 | 8:00 am |
| User B | 003 | Task C | Super offline user account 3 | 8:00 am |

At block S6, the implemented task to be executed by the super offline user account is executed.

In one embodiment, the implemented task to be executed by the super offline user account is executed by creating a temporary login token for the super offline user account and allowing the super offline user account to execute the implemented task to be executed with the temporary login token.

In one embodiment, the temporary login token is valid for a preset time duration.

When the task has completed being executed, the super offline user account is logged out, and information of the super offline user account that executed the task is recorded. The information includes one or more of execution time, the user account that completed the task, and an execution result.

In one embodiment, when a super offline user account is logged into the Oauth2.0 system, a temporary login token is generated, and the temporary login token is only used to perform the current implemented task and becomes invalid once the current implemented task has been completed. The temporary login token has an expiration time. If the expiration time is exceeded, the temporary login token must be applied for again. When the super offline user account completes the task, the login token corresponding to the task is logged out. The Oauth2.0 system automatically records information of the task, such as execution time, the user account that performed the task, and the execution result. A new temporary login token is generated for a next task that requires a super offline user account to complete.

Figure 2:
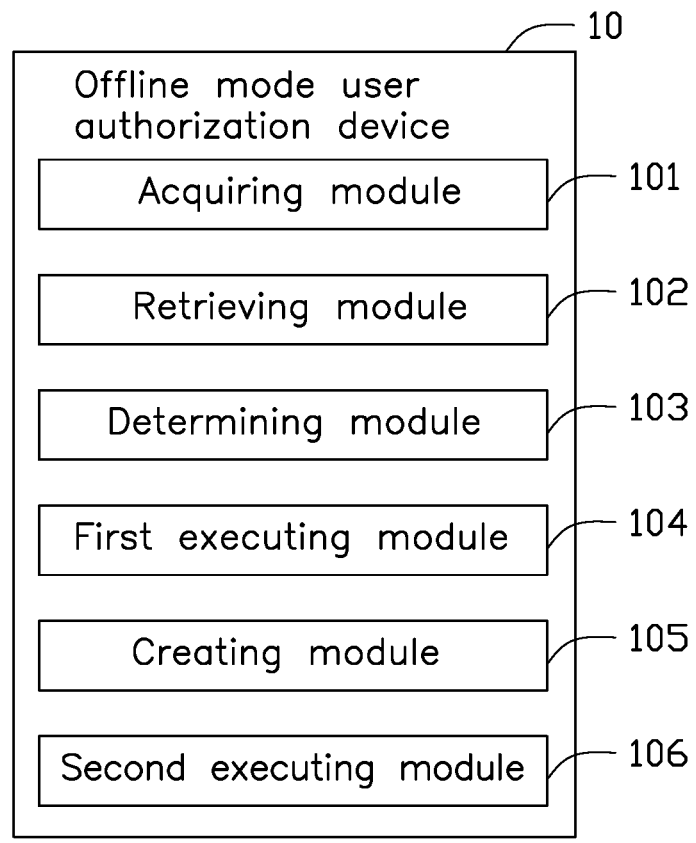
FIG. 2 is a block diagram of an embodiment of functional modules of an offline mode user authorization device.

FIG. 2 shows a diagram of an embodiment of an offline mode user authorization device 10.

In some embodiments, the offline mode user authorization device 10 operates in a computing device communicatively coupled to a plurality of user account terminals through a network. The offline mode user authorization device 10 can include a plurality of functional modules, which are a plurality of program instructions stored in a memory of the computing device and executed by at least one processor to implement the offline mode user account authorization functions.

The offline mode user authorization device 10 can be divided into a plurality of functional modules, such as an acquiring module 101, a retrieving module 102, a determining module 103, a first executing module 104, a creating module 105, and a second executing module 106.

The acquiring module 101 is configured to acquire the access privilege of a user account and set an offline task access privilege of the user account according to the access privilege.

Contents of an offline task include one or more of a task ID, a user ID, a user account name, task contents, task parameters, and a task execution scheduling plan.

In one embodiment, a user account is registered in the Oauth2.0 system, and an Oauth2.0 server allocates a corresponding access privilege to the user account according to information filled in by a user and according to preset system specifications. After obtaining the access privilege, offline tasks are set according to a scope of the access privilege and according to a scope of tasks to be handled.

The retrieving module 102 is configured to retrieve user account information corresponding to a task to be executed from a preset task information comparison table when the task to be executed is implemented.

In one embodiment, implementation of the task in the Oauth2.0 system is performed by an asynchronous queue, and multiple tasks can be implemented concurrently at the same time. When the task is implemented, the system retrieves the user account information of the user account that created the task from the task information comparison table.

The determining module 103 is configured to determine whether the user account is online.

Whether the user account is online is determined by searching, in a user account login information table, whether the login information of the user account exists according to the user account name information, and determining whether the user account is online according to the search result.

In one embodiment, in the Oauth2.0 system, when the task to be executed is implemented, the system retrieves the user account information of the user account that created the task from the task information comparison table and retrieves the login information of the system. If the user account is logged in, the user account is determined to be online according to a login status.

The first executing module 104 is configured to execute the implemented task to be executed with the user ID of the user account when the user account is online.

In one embodiment, when the user account is online, a login token is directly obtained with the user ID to execute the task.

The creating module 105 is configured to create a super offline user account if the user account is not online, and assign the offline task access privilege of the user account to the super offline user account.

The user account information is obtained from the task information comparison table, and the offline task scope of the user account is retrieved according to the user account information. The access privilege of the offline task scope is assigned to the super offline user account, so that the offline task can be completed.

In one embodiment, in the Oauth2.0 system, since the user account is in an offline state, the login token of the user account cannot be obtained to execute the implemented offline task. At this time, the system creates a super offline user account, and the access privilege of the super offline user account is assigned according to the offline task set by the user account.

For example, user account A creates tasks 001 and 002, and user account B creates task 003. Task contents corresponding to task 001, task 002, and task 003 are task A, task B, and task C, respectively. At this time, the Oauth2.0 system opens three threads to create super offline user account 1, super offline user account 2, and super offline user account 3 to complete the tasks 001, 002, and 003, respectively. Super offline user account 1 and super offline user account 2 obtain all of the access privilege of user account A, and super offline user account 3 obtains all of the access privilege of user account B. At a preset time of 8:00 am, when user account A is determined to not be online according to the login information of user account A in the user account login information table, super offline user account 1 obtains all of the access privilege of user account A and executes tasks 001 and 002. Similarly, at 8:00 am, when user account B is determined to not be online according to the login information of user account B in the user account login information table, super offline user account 3 obtains all of the access privilege of user account B and executes task 003.

The second executing module 106 is configured to execute the implemented task to be executed by the super offline user account.

In one embodiment, the implemented task to be executed by the super offline user account is executed by creating a temporary login token for the super offline user account and allowing the super offline user account to execute the implemented task to be executed with the temporary login token.

In one embodiment, the temporary login token is valid for a preset time duration.

When the task has completed being executed, the super offline user account is logged out, and information of the super offline user account that executed the task is recorded. The information includes one or more of execution time, the user account that completed the task, and an execution result.

In one embodiment, when a super offline user account is logged into the Oauth2.0 system, a temporary login token is generated, and the temporary login token is only used to perform the current implemented task and becomes invalid once the current implemented task has been completed. The temporary login token has an expiration time. If the expiration time is exceeded, the temporary login token must be applied for again. When the super offline user account completes the task, the login token corresponding to the task is logged out. The Oauth2.0 system automatically records information of the task, such as execution time, the user account that performed the task, and the execution result. A new temporary login token is generated for a next task that requires a super offline user account to complete.

Figure 3:
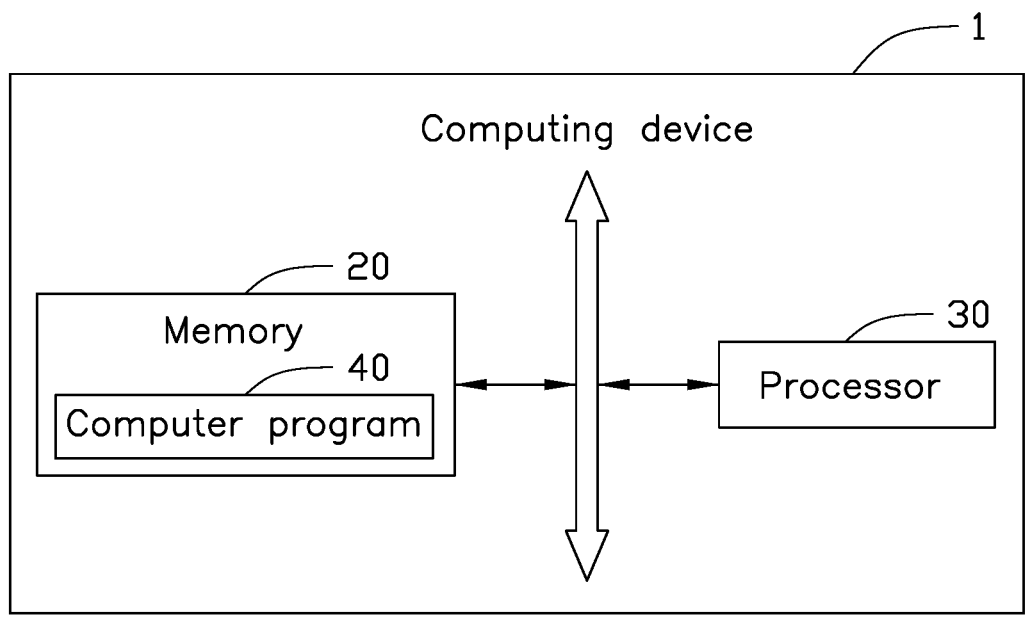
FIG. 3 is a block diagram of a computing device implementing a computer program.

FIG. 3 shows a diagram of an embodiment of a computing device 1. The computing device 1 includes a memory 20 and a processor 30, and a computer program 40, such as an offline mode user account authorization program, is stored in the memory 20 and executable by the processor 30. When the processor 30 executes the computer program 40, the offline mode user account authorization method may be implemented, that is blocks S1 to S6 shown in FIG. Alternatively, when the processor 30 executes the computer program 40, the functional modules of the offline mode user authorization device 10 shown in FIG. 2 are implemented.

The computer program 40 can be partitioned into one or more modules/units that are stored in the memory 20 and executed by the processor 30. The one or more modules/units may be a series of computer program instructions capable of performing particular functions of the computer program 40. For example, the computer program 40 can be divided into the acquiring module 101, the retrieving module 102, the determining module 103, the first executing module 104, the creating module 105, and the second executing module 106.

The computing device 1 may be a desktop computer, a notebook computer, a cloud server, or the like. The computing device 1 may include more or less components than those illustrated, and some components may be combined. The computing device 1 may also include input and output devices, network access devices, buses, and the like.

The processor 30 may be a central processing unit (CPU), or may be other general-purpose processors, a digital signal processor (DSP), an application specific integrated circuit (ASIC), a Field-Programmable Gate Array (FPGA), or other programmable logic device, discrete gate or transistor logic device, discrete hardware components, or the like. The processor 30 may be a microprocessor or other processor known in the art.

The memory 20 can be used to store the computer program 40 and/or modules/units by running or executing computer programs and/or modules/units stored in the memory 20. The memory 20 may include a storage program area and a storage data area. In addition, the memory 20 may include a high-speed random access memory, a non-volatile memory such as a hard disk, a plug-in hard disk, a smart memory card (SMC), and a secure digital (SD) card, flash card, at least one disk storage device, flash device, or other volatile solid state storage device.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An offline mode user authorization method comprising:
obtaining an access privilege of a user account and setting an offline task access privilege of the user account according to the access privilege;
retrieving user account information corresponding to a task to be executed from a preset task information comparison table when the task to be executed is implemented by an asynchronous queue;
determining whether the user account is online;
executing the task to be executed with a user ID of the user account if the user account is online; and
creating a super offline user account and assigning offline task access privilege of the user account to the super offline user account if the user account is not online, and creating a temporary login token for the super offline user account, and allowing the super offline user account to execute the implemented task to be executed with the temporary login token.

2. The offline mode user authorization method of claim 1, further comprising:
   determining whether the super offline user account has finished executing the task to be executed; and
   logging out the super offline user account and recording information of the super offline user account when the super offline user account has finished executing the task to be executed.

3. The offline mode user authorization method of claim 1, wherein:
   the offline task information comprises a task ID, a user ID, a user account name, task contents, task parameters, and a task execution scheduling plan.

4. The offline mode user authorization method of claim 1, wherein the step of determining whether the user account is online comprises:
   searching, in a user account login information table, whether login information of the user account exists according to user account name information; and
   determining whether the user account is online according to the search result.

5. The offline mode user authorization method of claim 1, wherein:
   the temporary login token is valid for a preset time duration.

6. The offline mode user authorization method of claim 1, further comprising:
   determining whether the implemented task to be executed has been completed; and
   suspending the temporary login token when the implemented task to be executed has been completed.

7. An offline mode user authorization device comprising:
   a processor; and
   a memory storing a plurality of instructions of a computer program, which when executed by the processor, causes the processor to:
   obtain an access privilege of a user account and set an offline task access privilege of the user account according to the access privilege;
   retrieve user account information corresponding to a task to be executed from a preset task information comparison table when the task to be executed is implemented by an asynchronous queue;
   determine whether the user account is online;
   execute the task to be executed with a user ID of the user account if the user account is online; and
   create a super offline user account and assign offline task access privilege of the user account to the super offline user account if the user account is not online, create a temporary login token for the super offline user account, and allows the super offline user account to execute the implemented task to be executed with the temporary login token.

8. The offline mode user authorization device of claim 7, wherein the processor further:
   determines whether the super offline user account has finished executing the task to be executed; and
   logs out the super offline user account and records information of the super offline user account when the super offline user account has finished executing the task to be executed.

9. The offline mode user authorization device of claim 7, wherein:
   the offline task information comprises a task ID, a user ID, a user account name, task contents, task parameters, and a task execution scheduling plan.

10. The offline mode user authorization device of claim 7, wherein when the processor determines whether the user account is online, the processor further:
    searches, in a user account login information table, whether login information of the user account exists according to user account name information; and
    determines whether the user account is online according to the search result.

11. The offline mode user authorization device of claim 7, wherein:
    the temporary login token is valid for a preset time duration.

12. The offline mode user authorization device of claim 7, wherein the processor further:
    determines whether the implemented task to be executed has been completed; and
    suspends the temporary login token when the implemented task to be executed has been completed.

* * * * *